May 28, 1940.   F. W. BAKER   2,202,080
VEHICLE WHEEL
Filed June 29, 1938

F. W. Baker
Inventor.
By CA Snowles.
Attorneys.

Patented May 28, 1940

2,202,080

UNITED STATES PATENT OFFICE 2,202,080

VEHICLE WHEEL

Frederick William Baker, Stourbridge, England

Application June 29, 1938, Serial No. 216,592
In Great Britain June 28, 1937

2 Claims. (Cl. 152—48)

This invention relates to means for detachably mounting a vehicle wheel on an axle or shaft of the type in which the wheel is held in driving connection with the axle or shaft or member thereon by means of a resilient or rubber member or members which is or are compressed by means of a screwed member engaged on the end of the axle or hub thereon, and it has for its object means whereby the screwed member is utilised to apply end pressure in accordance with the power transmitted by the axle to the wheel, whilst ensuring that sufficient pressure on the resilient members will be retained when the drive is reversed.

According to the present invention, means are provided to prevent the screwed member unscrewing when the vehicle is driven in reverse, so that the resilient member or members will be retained in a compressed condition during such reverse drive.

In order that the invention may be clearly understood and readily carried into effect, reference may be had to the accompanying drawing on which—

Figure 1:
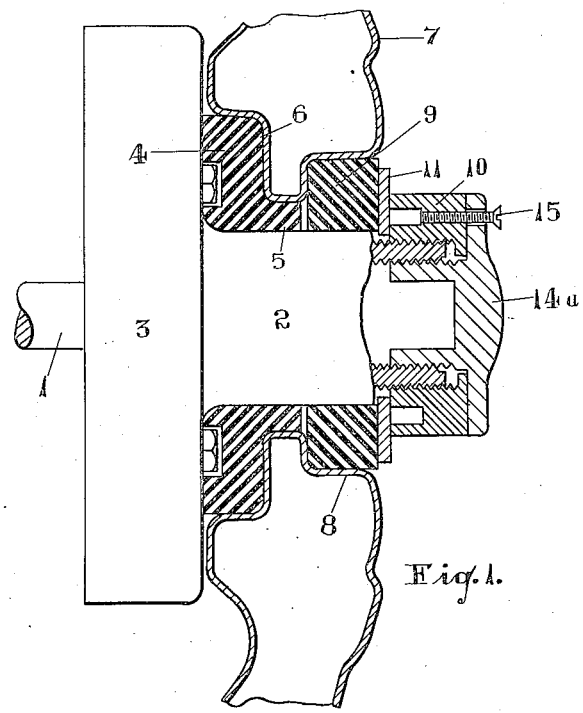
Figure 1 is a sectional elevation of a wheel mounting constructed according to this invention.
Figure 3:
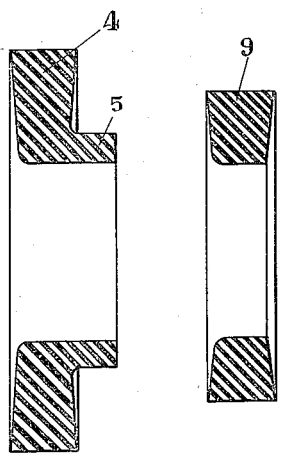
Figures 3 and 4 are cross-sections of rubber discs.
Figure 4:

According to a convenient embodiment of this invention, the axle shaft 1 of a motor vehicle has fixed thereon a hub member 2 and the brake drum 3. The road wheel 7 is mounted in driving connection with the axle 1 through the medium of a rubber disc 4 (Figs. 1 and 3) having a sleeve 5 which is mounted on the member 2. The wheel 7 is mounted on the sleeve 5 so that it is insulated from the member 2 and has a recess 6 which receives the rubber disc 4. On the outer face, the wheel 7 has a recess 8 which receives a rubber disc 9 (Figs. 1 and 4) mounted on the member 2. A screwed member 10 is internally screw threaded and is screwed on the external outer end of the member 2 and is adapted to bear against a pressure plate 11 arranged on the outside of the rubber disc 9.

The screwed member 10 compresses the rubber discs 4 and 9, so that the road wheel 7 is in driving connection with the axle or parts thereon. When the axle is rotating to drive the road wheel forward, the force transmitted by the axle tends to screw the member 10 axially to further compress the rubber disc so that the road wheel 7 is resiliently gripped in driving connection with the axle shaft in accordance with the power transmitted. The disc 9 is compressed between the pressure plate 11 and the wall of the recess 8 opposite such plate and the rubber is squeezed outwardly so that it grips the annular faces of the recess 8 and the member 2. At the same time the wheel 7 is pressed to compress the rubber disc 4 between the wall of the brake drum 3 and the face of the recess 6 opposite such brake drum and at the same time rubber is squeezed outwardly to be pressed against the annular face of the recess 6 and the member 2. The compression of the rubber increases with the power transmission and therefore the greater the power transmitted the greater is the grip binding the road wheel in driving connection with the axle shaft or member thereon. The outward pressure of the rubber disc against the annular faces forms the main or an important part of the binding connection. The discs, rings or washers 4 and 9 preferably increase in thickness towards the periphery as shown. The driving force has to pass through the mass of rubber and therefore the drive is through a resilient body which absorbs shock and vibration and forms a cushion drive. The sleeve 5 insulates the wheel from the axle so that there is no metal to metal contact.

When the drive through the axle 1 is reversed, means are provided to prevent release of the driving grip, and for this purpose the outer end of the member 2 is internally screw threaded in the opposite direction to that of the screw thread on the external surface and a lock nut 14a is screw threaded thereon. The screwed member 10 consequently transmits the endwise pressure. The locking member 14a is fixed against relative rotation to the member 10 by means of the screw 15 which permits of relative longitudinal movement, due to the fact that such parts move longitudinally in reverse directions when rotated on the member 2 in the same direction. This lock nut when the axle 1 is driving in reverse, will be automatically tightened and will prevent the unscrewing of the member 10a.

Figure 2:
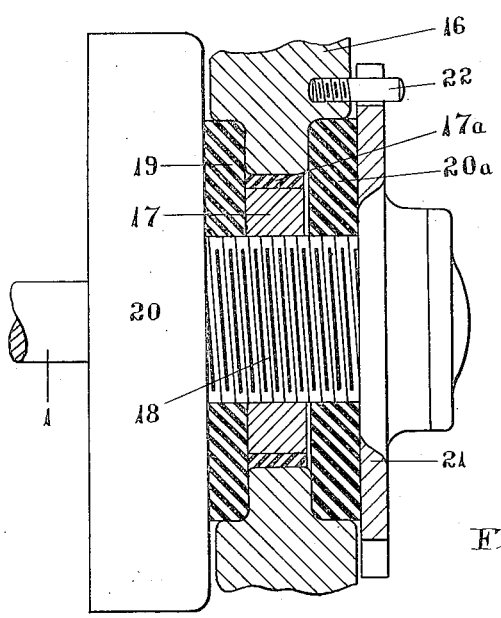
Figure 2 is a sectional elevation of a further modified form of the invention.

According to a modified form of the invention, as shown by Figure 2, the wheel 16 is non-rotatably mounted but axially slidable on a multi-sided member 17 having screwed engagement with the hub member 18 carried by the axle shaft, a rubber or other sleeve 17a insulating the wheel from the screwed member 17. A rubber disc 19 is located between the brake drum 20 and the member 17 and when the axle shaft is driving the vehicle forward the screwed sleeve compresses the rubber disc 19. A rubber disc 20a is located against the outer face of the wheel 16 and a member 21 having screwed engagement with the hub member 18 compresses such rubber disc against the wheel. The member 21, after being fixed in position, is connected to the wheel 16 to prevent relative rotation by means of a pin 22, conveniently having a rubber or other resilient sleeve thereon, which engages a notch in the periphery of the member 21 and screws into the wheel. The member 21 has a number of notches therearound to give adjustment. The member 21 will thus move axially in unison with the screwed member 17, and bind the rubber discs in driving connection with the wheel and hub member 18. The screwed member 21 is locked against unscrewing by the lock nut device 14a as described in the previous embodiment. Again in lieu of the wheel being mounted on a multi-sided screwed sleeve, such screwed sleeve may be circular and have a pin which engages in a hole in the wheel.

In lieu of a rubber body any other similar resilient body can be used.

In the modifications above described the road wheel is detachable, and a portion of the detachable wheel is gripped by the rubber disc or discs or members, but if desired the wheel mounted on the hub 2, may be formed in two parts, comprising an inner part mounted on the hub 2 and held in driving connection therewith by the rubber disc or discs and an outer portion detachably fixed to the inner portion. The driving connection of the hub mounting is not disturbed when the detachable portion of the wheel is removed.

I claim:

1. Means for detachably mounting a vehicle driving wheel on a hub of the type set forth, comprising a hub, a body of resilient material forming a ring, a detachable pressure member having screwed engagement with the hub and adapted to be screwed endwise on the hub when the hub is rotated to compress the said ring by the driving force applied to the wheel and means for limiting the unscrewing of the said screwed member when the vehicle is driven in reverse, so that the resilient member will be retained in a compressed condition during such reverse drive, comprising a locking member reversely screwed to that of the pressure member and screwed into the bore of the hub, and means for non-rotatably fixing such locking member to the said screwed pressure member whilst allowing relatively axial movement.

2. Means for detachably mounting a vehicle driving wheel on a hub of the type set forth, comprising a hub, a body of resilient material forming a ring which increases in thickness towards the periphery, a detachable wheel having a recess for receiving the said ring and against the periphery of which recess the ring is expanded radially, a detachable pressure member having screwed engagement with the hub and adapted to be screwed endwise on the hub when the hub is rotated to compress the said ring by the driving force applied to the wheel and means for limiting the unscrewing of the said screwed member when the vehicle is driven in reverse so that the resilient member will be retained in a compressed condition during such reverse drive, comprising a locking member reversely screwed to that of the pressure member and screwed into the bore of the hub, and means for non-rotatably fixing such locking member to the said screwed pressure member whilst allowing relatively axial movement.

FREDERICK WILLIAM BAKER.